United States Patent [19]

Ino et al.

[11] Patent Number: 4,882,183

[45] Date of Patent: Nov. 21, 1989

[54] METHOD FOR PRODUCTION OF OXIDE FILM

[75] Inventors: Juichi Ino; Akihiro Hishinuma; Hirotsugu Nagayama; Hideo Kawahara, all of Osaka, Japan

[73] Assignee: Nippon Sheet Glass Co., Ltd., Osaka, Japan

[21] Appl. No.: 178,154

[22] Filed: Apr. 6, 1988

[30] Foreign Application Priority Data

Aug. 27, 1987 [JP]  Japan .................................. 62-213624
Jan. 11, 1988 [JP]  Japan ..................................... 63-3451

[51] Int. Cl.$^4$ .............................................. B05D 5/12
[52] U.S. Cl. ................................. 427/126.6; 427/108; 427/126.3; 427/164; 427/165; 427/372.2
[58] Field of Search ............... 427/126.3, 126.2, 126.6, 427/164, 165, 377, 372.2, 108

[56] References Cited

U.S. PATENT DOCUMENTS

| | | | |
|---|---|---|---|
| 4,342,792 | 8/1982 | Brown et al. | 427/126.3 |
| 4,369,105 | 1/1983 | Caldwell et al. | 427/126.3 |
| 4,468,420 | 8/1984 | Kawahara . | |
| 4,496,404 | 1/1985 | King . | |

FOREIGN PATENT DOCUMENTS

| | | |
|---|---|---|
| 0121817 | 10/1984 | European Pat. Off. . |
| 965792 | 8/1964 | United Kingdom . |
| 1056357 | 1/1967 | United Kingdom . |
| 1258021 | 12/1971 | United Kingdom . |
| 1373150 | 11/1974 | United Kingdom . |
| 2035979 | 6/1980 | United Kingdom . |
| 2157325 | 10/1985 | United Kingdom . |
| 2144733 | 2/1987 | United Kingdom . |
| 2179371 | 3/1987 | United Kingdom . |

OTHER PUBLICATIONS

Electroless Deposition of $In_2O_3$ and $In_2O_3$:Sn-(ITO)–Raviendra et al.–5/29/84.
Electroless Deposition of Cadmium Stannate. . . –Raviendra et al.–1/16/85.
Electroless Deposition of $SnO_2$ and Antimony. . . –Raviendra et al.–1/10/85.

*Primary Examiner*—Janyce Bell
*Attorney, Agent, or Firm*—Kanesaka and Takeuchi

[57] ABSTRACT

A film of the oxide of a metal selected from the group consisting of Sn, Zr, In, V, Cr, Mn, Fe, Co, Ni, and Cu is deposited on the surface of a substrate by a method which comprises establishing contact between the substrate and a treating liquid containing fluorine and the metal selected as described above thereby having the oxide of the metal dissolved to supersaturation therein.

30 Claims, 3 Drawing Sheets

METHOD FOR PRODUCTION OF OXIDE FILM

BACKGROUND OF THE INVENTION

1. Field of the Invention

This invention relates to a method for the production of a film of oxide of at least one member selected from the group consisting of Sn, Zr, Zn, In, V, Cr, Mn, Fe, Co, Ni, and Cu and more particularly to a method for the production of a film of the oxide, which comprises establishing contact between a treating liquid supersaturated with the aforementioned metal oxide and a substrate thereby effecting deposition of the metal oxide on the surface of the substrate.

2. Description of the Prior Art

Metal oxide films have found extensive utility in various industrial fields.

For example, tin oxide films possess excellent rigidity and have been widely used for scratchproofing the surfaces of glass bottles and dinner sets. There are a number of applications which make use of the semiconductive nature of such tin oxide films. Glasses coated with tin oxide films, for example, have found popular utility as transparent electrode plates for liquid crystal cells, frostproof glass, and transparent conductors. They further excel in the infrared reflection property and, by virtue of this feature, have been famed for their full usefulness as cover glasses for solar heat collectors.

Zirconium oxide films, similarly to titanium dioxide films, have found utility as high-refraction films in anti-reflection multi-layer films.

Zinc oxide films, in a form doped with aluminum, for example, are used as transparent conductor films. Zinc oxide films of the type produced with oriented crystals find popular utility in a broad spectrum of photoelectric conversion devices.

Indium oxide films such as, for example, Sn-doped indium-tin oxide (ITO) films have found widespread utility as in transparent conductor films.

Transition metal oxide films have found popular utility as colored films, magnetic films, and conductor films.

As means of producing such oxide films, the following methods have been adopted.

For the deposition of a tin oxide film on the surface of a substrate, a method which comprises spraying a solution of tin tetrachloride in an organic solvent on a substrate kept at an elevated temperature has long been adopted as an approach suitable for mass production among other methods. In recent years, the so-called CVD method which comprises exposing the surface of a substrate kept at an elevated temperature to the vapor produced by heating tin tetrachloride or dimethyl tin dichloride has been used widely.

For the production of zirconium oxide films as optical material, the method of vacuum deposition is generally adopted.

For the production of zinc oxide films, the vacuum deposition method, the spattering method, and the CVD method which have been heretofore adopted for the production of films of various types find utility.

As means for the production of indium oxide films, the spattering method, for example, has been found acceptable.

As means for the production of transition metal oxide films, the spattering method, the CVD method, the spray method, etc. have been found acceptable.

The conventional methods for the production of metal oxide films described above, however, have a disadvantage that since they require substrates to be kept at elevated temperatures during the formation of films thereon, they are not allowed to deposit metal oxides on substrates of materials incapable of withstanding the elevated temperatures. Further, on substrates which have three-dimensionally irregular surfaces instead of flat surfaces, these methods produce coats of uniform wall thickness only with difficulty and tend to impair the evenness of wall thickness of the produced coats. The spatter method, the CVD method, etc. which require to use voluminous production facilities have a disadvantage that on account of restrictions inevitably imposed on the production facilities, they are prevented from depositing films inexpensively on the surface of large substrates.

The vacuum deposition method indeed enjoys an advantage that it is capable of producing a zirconium oxide film, for example, on the surface of an optical lens with high accuracy. It nevertheless suffers from a disadvantage that it is incapable of producing a zirconium oxide film uniformly on the surface of a substrate having a large surface area or on a substrate having a three-dimensionally irregular surface and it incurs a high production cost because it requires use of expensive devices such as a vacuum device.

OBJECT OF THE INVENTION

An object of this invention is to provide a method for the production of an oxide film, which permits the oxide film to be formed in uniform wall thickness even on the surface of a substrate possessing a three-dimensionally irregular surface without entailing any of the disadvantages suffered by the conventional methods as described above.

Another object of this invention is to provide a method for the production of an oxide film, which permits the oxide film in uniform wall thickness even on the surface of a substrate of large size.

A further object of this invention is to provide a method for the production of an oxide film, which permits the oxide film to be formed in a highly desirable state even on the surface of a substrate susceptible of damage by heating.

Yet another object of this invention is to provide a method for the production of an oxide film, which permits the oxide film to be formed at low cost.

The other objects and characteristic features of the present invention will become apparent to those skilled in the art as the disclosure is made in the following description of preferred embodiments of the invention, as illustrated in the accompanying drawings.

DETAILED DESCRIPTION OF THE PREFERRED EMBODIMENTS

Figure 1:
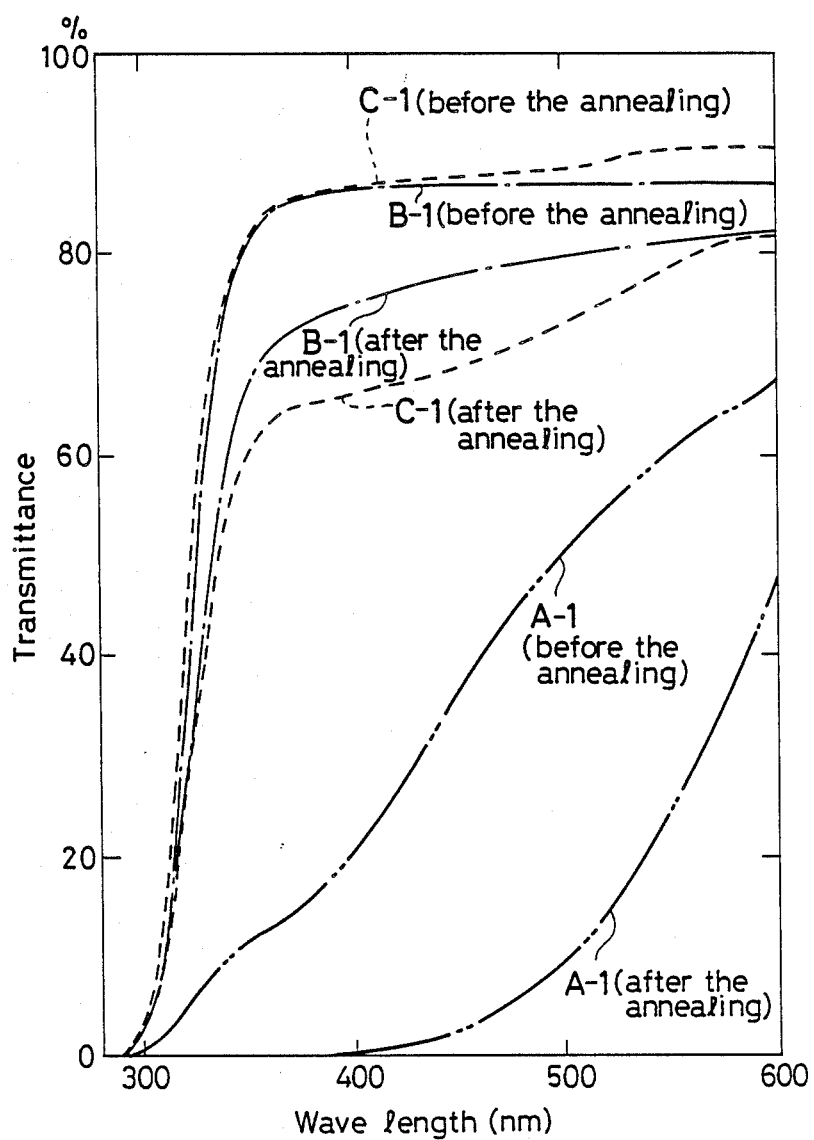
FIG. 1 is a diagram showing absorption spectra of oxide films produced in Example 9.

The method by which the oxide film of the present invention is produced comprises establishing contact between a substrate and a treating liquid containing fluorine and at least one metal selected from the group consisting of Sn, Zr, Zn, In, V, Cr, Mn, Fe, Co, Ni, and Cu and supersaturated with the oxide of the selected metal thereby depositing a film of the oxide of the metal fast on the surface of the substrate.

Generally when a saturated solution of the aforementioned metal is only supersaturated without incorporating fluorine therein, this solution only induces precipitation of the oxide of the metal and is not enabled to deposit a coat of uniform wall thickness on the surface of the substrate exposed to the solution. The present invention attains uniform deposition of a film of a metal oxide on the surface of a substrate without reference to the three-dimensional regularity of surface or the size of surface area by using a solution containing fluorine and a metal and supersaturating the solution with metal compound having the fluorine atom as a ligand thereof thereby curbing otherwise possible occurrence of a precipitate in the solution.

The treating liquid supersaturated with the metal oxide and used in the present invention can be prepared by a method which comprises adding at least one additive selected from the group consisting of metals, metal oxides, metal chlorides, metal hydroxides, and boric acid to an aqueous solution supersaturated with a metal oxide such as, for example, a product obtained by dissolving in hydrofluoric acid (HF) substantially to saturation at least one metal selected from the group consisting of Sn, Zr, Zn, In, V, Cr, Mn, Fe, Co, Ni, and Cu or a product obtained by dissolving the fluoride of the aforementioned metal in an aqueous solution, a method comprising elevating or lowering the temperature of the solution, or a method which comprises decreasing the amount of the metal oxide required for the saturation.

The solution supersaturated with tin oxide, for example, can be prepared by adding to an aqueous solution such as a solution obtained by dissolving stannous oxide to saturation in hydrofluoric acid (HF) or an aqueous solution of tin fluoride ($SnF_2$) one member selected from the group consisting of metal oxides, metal hydroxides, and metal chlorides represented by $AlCl_3$, $CaCl_2$, $BaCl_2$, $NiCl_2$, $CoCl_2$, $CuCl_2$, $FeCl_2$, $ZnCl_2$, $ZrCl_4$, $Al(OH)_3$, $Zn(OH)_2$, $SnCl_4$, $SnCl_2$, $ZnO$, $ZrO_2$ and $H_3BO_3$ and aqueous solutions thereof.

The solution supersaturated with zirconium oxide can be prepared as by adding at least one additive selected from the group consisting of metals, metal chlorides, metal hydroxides, and boric acid to a saturated aqueous solution of zirconium oxide which is produced by dissolving to saturation zirconium oxide in an aqueous zirconium hydrofluoric acid ($H_2ZrF_6$), for example.

The solution supersaturated with zinc oxide, indium oxide, or the oxide of such a transition metal as Co or Fe can be prepared by adding the aforementioned additive to such an aqueous solution as a solution obtained by dissolving to saturation zinc oxide, indium oxide, or transition metal oxide in hydrofluoric acid (HF) or a solution obtained by dissolving a transition metal fluoride such as zinc fluoride ($ZnF_2$), indium fluoride ($InF_3$), ferric fluoride ($FeF_3$), or cobalt fluoride ($CoF_3$) in an aqueous solution.

As examples of the additive to be used in supersaturating aqueous solutions with zirconium oxide, zinc oxide, indium oxide, and transition metal oxides, there can be cited metals, metal chlorides, metal hydroxides, and boric acid, viz. Al, Fe, $AlCl_3$, $FeCl_2$, $FeCl_3$, $Al(OH)_3$, $H_3BO_3$, and $B_2O_3$.

Desirably, this additive is used in the aforementioned treating liquid in a ratio in the range of 0.1 to 100 mols per mol of the metal present in the treating liquid. If the amount of the additive to be used is less than 0.1 mol, the degree of supersaturation with the metal oxide is low so that the precipitation proceeds slowly, the formation of a film tends to consume much time, and the liquid is liable to corrode the substrate. Conversely, if the amount of the additive used exceeds 100 mols, the degree of supersaturation with the metal oxide is so high that the liquid tends to induce precipitation and deposition of the metal oxide.

Particularly, in the case of tin oxide, the amount of the additive so used is desired to fall in the range of 0.5 to 5 mols per mol of fluorine as HF.

In the case of zirconium oxide, the additive is desired to be used in a ratio falling in the range of 2 to 10 mols per mol of zirconia hydrofluoric acid present in the liquid. In the case of zinc oxide, the additive is desired to be used in a ratio falling in the range of 0.1 to 50 mols per mol of zinc present in the liquid. In the case of indium oxide, the additive is desired to be used in a ratio falling in the range of 1 to 50 mols per mol of indium present in the liquid. And in the case of a transition metal oxide, the additive is desired to be used in a ratio falling in the range of 0.1 to 100 mols per mol of the transition metal present in the liquid.

In the solution containing the aforementioned metal and fluorine prior to the incorporation of the additive therein, the concentration of the metal is desired to be as close to saturation as permissible. Even when this concentration is low, the state of supersaturation with the oxide as aimed at can be attained by allowing the aforementioned additive to be dissolved therein in a proportionately large amount. When the concentration is unduly low, the liquid inevitably requires use of the additive in a very large amount. Thus, the concentration of the metal is desired to be at least 0.0001 mol/liter.

Where the aqueous solution of zirconium hydrofluoric acid . ($H_2ZrF_6$) is used, the concentration of the zirconium hydrofluoric acid is desired to fall in the range of 0.1 to 2 mols/liter. If the concentration is lower than 0.1 mol/liter, the solution is liable to induce precipitation and suspension of particles in the solution. If the concentration exceeds 2 mols/liter, the solution suffers from heavy lieration of fluorine by volatization and tends to dictate careful handling.

The substrate intended for contact with the treating liquid can be made of any material on the sole condition that it refrains from reacting with the treating liquid or reacts with it only sparingly. Examples of the material satisfying this condition include glass materials, plastic materials, and inorganic materials. For use in the present invention, the substrate may be used in any of numerous known forms such as, for example, powder, threads, fluffy mass, tubes, sheet, plate, or cylinder.

The temperature of the treating liquid for contact with the substrate is desired not to exceed 60° C. in due respect to the reactivity of the liquid. The pH value of the treating liquid is desired to be kept below 2, preferably below 1.

As regards the manner of contact between the treating liquid and the substrate, the method which effects this contact by gravitational flow of the treating liquid over the surface of the substrate may be adopted. The method which attains this contact by immersing the substrate in a tank filled with the treating liquid proves to be more advantageous because it is simple in procedure and produces the film with uniform wall thickness.

As a subsequent step of the production of the oxide film by the method described above, a heat treatment may be given to the produced oxide film. This heat treatment is desirable because it promotes growth of crystals in the oxide film and improve the physical properties (such as coloring property and adhesive strength of the film). Though the temperature of this heat treatment may be freely fixed in due consideration of the relation between the thoroughness of heat treatment and the thermal stability of the substrate, it is desired to be as high as permissible (such as, for example, a temperature not exceeding 1,000° C., preferably falling in the range of 100° to 600° C.). The duration of this heat treatment is desired to be at least 10 minutes.

This invention is directed to the method for the production of a film of the aforementioned metal oxide. Optionally, this method may be carried out in combination with other similar method which produces a precipitated film (at least one metal oxide selected from among silicon oxide, titanium dioxide, tantalum oxide, etc.) so as to permit the oxide film of this invention to include therein the oxide of some other metal. This mixed metal oxide film containing the other oxide is allowed to adjust the properties (weatherability, electric properties, and optical properties) of the aforementioned film of metal oxide as desired.

Since this invention relies on the precipitation of metal oxide from the treating liquid for the production of metal oxide film, it permits the metal oxide film to be easily and inexpensively formed on the surface of a substrate without reference to the three-dimensional regularity of surface or the size of surface area. Further, it permits the film to be formed on a large surface by the use of a simple immersion tank. Since the method of this invention does not require to heat the substrate during the course of the formation of the film, the film can be formed at a temperature near normal room temperature. Thus, the method of this invention can be applied even to substrates which are deficient in thermal stability (such as molded articles of plastics) or susceptible of degeneration of quality by heat. By suitably altering the conditions for the formation of film, the films may be produced with modified properties.

EXAMPLE 1

Soda lime glass pieces measuring equally 50 mm in length and width and 1 mm in thickness and silicon wafers measuring equally 25 mm in length and width and 500 μm in thickness were thoroughly cleaned and dried to be used as sample substrates. Then, stannous oxide was dissolved to saturation in an aqueous solution containing 1 mol of hydrogen fluoride per liter. Then, the resultant solution was filtered to separate off undissolved stannous oxide. In 300-ml beakers, 100-ml aliquots of the filtrate mixed severally with 50 ml, 70 ml, 80 ml, 90 ml, 100 ml, and 200 ml of the aqueous solution containing 1 mol of AlCl₃ per liter were placed. On a water bath kept at 30° C., the beakers containing the diluted filtrates were set and heated. In the treating liquids thus prepared in the beakers, the aforementioned sample substrates were immersed one each and left standing therein for 16 hours. After the standing, the sample substrates were removed from the beakers and cleaned and dried. Then, the films deposited on the substrates were tested for wall thickness with a contact needle type film thickness tester. The results were as shown in Table 1. When the samples now coated with a film were analyzed by ESCA (X-ray photoelectron spectrography), the films were found to be formed of a substance consisting of Sn and O.

TABLE 1

| Solution containing 1 mol of AlCl₃ per lit. | Glass | Silicon wafer |
| --- | --- | --- |
| 50 ml | Etching (corrosion) | 20 nm |
| 70 ml | Etching (corrosion) | 44 nm |
| 80 ml | Etching (corrosion) | 66 nm |
| 90 ml | Etching (corrosion) | 70 nm |
| 100 ml | Etching | 82 nm |
| 200 ml | 37 nm | 100 nm |

EXAMPLE 2

A soda lime glass piece measuring equally 50 mm in length and width and 1 mm in thickness was thoroughly cleaned and dried to be used as a sample substrate. Then, stannic chloride (SnCl₄) was dissolved to saturation at room temperature in distilled water. The resultant aqueous solution was filtered, to be used as a treating liquid. A 100-ml beaker containing a mixture of 30 ml of the filtrate with 30 ml of an aqueous solution containing 1 mol of stannic chloride per liter and an 5 ml of an aqueous solution containing 0.5 mol of boric acid per liter was set on a water bath kept at 35° C. and heated thereon. In the treating liquid thus prepared, the aforementioned sample substrate was immersed and left standing therein for 16 hours. The sample substrate was removed from the beaker, cleaned, and then dried. Thereafter, the film formed on the substrate was tested for thickness with a contact needle type film thickness tester. Thus, the film thickness was found to be 20 nm. By ESCA (X-ray photoelectron spectrography) analysis, the film was found to be formed of a substance consisting substantially of Sn and O.

EXAMPLE 3

Soda lime glass pieces measuring equally 50 mm in length and width and 1 mm in thickness were thoroughly cleaned and dried to be used as sample substrates. A solution was prepared by dissolving zirconium oxide (ZrO₂) to saturation in an aqueous 40% H₂ZrF₆ solution, a commercially available reagent, filtering the resultant solution, and diluting the filtrate with distilled water to a concentration of 0.5 mol/liter. In 300-ml beakers, 100-ml aliquots of the resultant ZrO₂-saturated aqueous H₂ZrF₆ solution mixed severally with 150 ml and 200 ml of an aqueous solution containing 1 mol of aluminum chloride per liter were placed. The beakers were set on a water bath kept at 30° C. and heated thereon. In the treating liquids thus prepared, the sample substrates were placed one each and left standing therein for 16 hours. After the standing, the sample substrates were removed from the beakers, cleaned, and then dried. By the test for thickness with a contact needle type film thickness tester, uniform films 78 nm and 20 nm respectively in thickness were found to be formed in the treating liquids having added thereto 150 ml and 200 ml respectively of the aqueous solution of 1 mol of aluminum chloride. By ESCA (X-ray photoelectron spectrograph) test, the films on the two sample substrates were found to be formed of a substance consisting of Zr and O and containing no detectable element originating in the glass substrate. The results clearly indicate that the films thus formed were made of zirconium oxide.

EXAMPLE 4

A soda lime glass piece measuring equally 50 mm in length and width and 1 mm in thickness was thoroughly cleaned and dried, to be used as a sample substrate. A solution was prepared by dissolving to saturation $ZrO_2$ powder in an aqueous 40% $H_2ZrF_6$ solution, a commercially available reagent, and filtering the resultant solution. A 300-ml beaker containing a mixture of 40 ml of the $ZrO_2$-saturated aqueous $H_2ZrF_6$ solution with 200 ml of an aqueous solution containing 1 mol of aluminum chloride per liter was set on a water bath kept at 35° C. and heated thereon.

In the treating liquid thus prepared, one sample substrate was immersed and left standing therein for 16 hours. Then, the sample substrate was removed from the treating liquid, cleaned, and dried. A uniform film was consequently formed on the glass substrate. By the measurement with a contact needle type film thickness tester, the thickness of this film was found to be 100 nm.

EXAMPLE 5

Soda lime glass pieces measuring equally 50 mm in length and width and 1 mm in thickness and silicon wafers measuring equally 25 mm in length and width and 500 μm in thickness were thoroughly cleaned and dried, to be used as sample substrates.

A treating liquid was obtained by dissolving $ZrF_2$ to saturation in distilled water at room temperature and filtering the resultant aqueous solution. In 300-ml beakers, 100-ml aliquots of the filtrate mixed severally with 200 ml, 100 ml, and 20 ml of an aqueous solution containing 1 mol of $AlCl_3$ per liter were placed. The beakers were set on a water bath kept at 35° C. and heated. The aforementioned sample substrates were immersed one each in the treating liquids held in the beakers and left standing therein for 16 hours. After the standing, the sample substrates were removed from the beakers, cleaned, and dried.

Then, the films formed on the substrates were tested for thickness with a contact needle type film thickness tester. The results were as shown in Table 2. By the ESCA (X-ray photoelectron spectrography) analysis, the films on the samples were found to be a substance consisting substantially of Zn and O.

EXAMPLE 6

Soda lime glass pieces measuring equally 50 mm in length and width and 1 mm in thickness were thoroughly cleaned and dried, to be used as sample substrates. A treating liquid was obtained by dissolving $ZnF_2\cdot 4H_2O$ to saturation at room temperature in distilled water and filtering the resultant aqueous solution. In 300-ml beakers, 100-ml aliquots of the filtrate mixed severally with 20 ml, 50 ml, and 150 ml of an aqueous solution containing 0.5 mol of boric acid per liter were placed. The beakers were set on a water bath kept at 35° C. and heated. The aforementioned sample substrates were immersed one each in the treating liquids and left standing for 16 hours. After the standing, the sample substrates were removed from the beakers and cleaned and dried. With a contact needle type film thickness tester, the films formed on the substrates were tested for thickness. The results were as shown in Table 3. By the ESCA (X-ray photoelectron spectrography) analysis, the films on the samples were found to be formed of a substance consisting substantially of Zn and O.

TABLE 2

| Treating liquid | Among of $AlCl_3$ added | Thickness of film on glass substrate | Thickness of film on Si substrate |
| --- | --- | --- | --- |
| 100 ml | 200 ml | 20 nm | 20 nm |
| 100 ml | 100 ml | 30 nm | 30 nm |
| 100 ml | 20 ml | 50 nm | 50 nm |

TABLE 3

| Treating liquid | Amount of boric acid added | Thickness of film on glass substrate |
| --- | --- | --- |
| 100 ml | 20 ml | 300 nm |
| 100 ml | 50 ml | 500 nm |
| 100 ml | 150 ml | 50 nm |

EXAMPLE 7

An aqueous 50% HF solution and indium hydroxide ($In_2\cdot nH_2O$) reagent powder were mixed in amounts calculated to give a total In:F ratio of 1:1 by mol. The resultant mixture was diluted with water to 10 times the original volume, stirred for two hours, and then left standing overnight. The diluted mixture was filtered and the filtrate was used as a treating liquid.

A soda lime glass measuring equally 50 mm in length and width and 1 mm in thickness was thoroughly cleaned and dried, to be used as a sample substrate.

In a 200-ml beaker, 100 ml of the treating liquid and 20 ml of an aqueous solution containing 0.5 mol of boric acid per liter added thereto were placed. The beaker was set on a water bath kept at 35° C. and heated. Then, the aforementioned sample substrate was immersed in the mixture in the beaker and left standing therein for about 16 hours. Then, the sample substrate was removed from the beaker, cleaned, and dried. By the test with a contact needle type film thickness tester, the film formed on the sample substrate was found to have a thickness of 200 nm. Then, for the purpose of testing the film and the substrate glass for their adhesive strength, an adhesive tape was applied fast to the surface of the film and ripped off. Absolutely no separation of the film was observed, indicating that the adhesion of the film to the substrate glass was strong. By the ESCA(X-ray photoelectron spectrography) analysis, the film on the sample substrate was found to be a substance consisting substantially of In and O.

EXAMPLE 8

Soda lime glass pieces measuring equally 50 mm in length and width and about 1 mm in thickness and silicon wafers measuring equally 25 mm in length and width and about 500 μm in thickness were thoroughly cleaned and dried, to be used as sample substrates.

Then, solutions A (Fe), B (Ni), C (Co), and D (Cu) were obtained by severally dissolving $FeF_3\cdot 3H_2O$, $NiF\cdot nH_2O$, $CoF_2\cdot 3H_2O$, and $CuF_2\cdot 2H_2O$ substantially to saturation at room temperature in distilled water and filtering the resultant aqueous solutions.

Thereafter, treating liquids, A-1 and A-2, were obtained by adding 10 ml and 20 ml respectively of an aqueous solution containing 0.5 mol of $H_3BO_3$ per liter to 100-ml aliquots of the solution A (Fe); treating liquids, B-1 and B-2, by adding 5 ml and 20 ml respectively of an aqueous solution containing 0.5 mol of $H_3BO_3$ per liter to 100-ml aliquots of the solution B (Ni); treating liquids, C-1 and C-2, by adding 3.4 ml and 20 ml respectively of an aqueous solution containing 0.5 mol of $H_3BO_3$ per liter to 100-ml aliquots of the solution C (Co); and treating liquids, D-1 and D-2, by adding 80 ml and 70 ml respectively of an aqueous solution containing 0.5 mol of $H_3BO_3$ per liter to 20-ml aliquots of the solution D (Cu).

The aforementioned treating liquids were placed severally in 200-ml beakers and two soda lime glass pieces and one silicon wafer were immersed in each of the treating liquids and left standing therein for 16 hours. At the end of the standing, the sample substrates were removed, cleaned, and then dried.

The films consequently formed on the substrates were tested for thickness with a contact needle type film thickness tester. The results were as shown in Table 4. By the ESCA (X-ray photoelectron spectrography) analysis, the films formed on the substrates with the treating liquids A-1 and A-2 were found to be formed of a substance consisting substantially of Fe and O; the films formed with the treating liquids B-1 and B-2 to be formed of a substance consisting substantially of Ni and O; the films formed with the treating liquids C-1 and C-2 to be formed of a substance consisting substantially of Co and O; and the films formed with the treating liquids D-1 and D-2 to be formed of a substance consisting substantially of Cu and O.

The glass samples on which films were formed with the treating liquids A-1, B-1, and C-1 were annealed, one each, at 450° C. for one hour. With a spectrophotometer, absorption spectra were obtained of the glass samples having the films of the treating liquids A-1, B-1, and C-1 formed thereon, each before and after the annealing. The results were as shown in FIG. 1. It is clearly noted from FIG. 1 that the optical characteristics of the films were affected by the aforementioned annealing treatment.

TABLE 4

| Trating liquid | Thickness of film on glass substrate (nm) | Thickness of film on Si substrate |
|---|---|---|
| A-1 | 250 | 250 |
| A-2 | 80 | 80 |
| B-1 | 430 | 430 |
| B-2 | 30 | 30 |
| C-1 | 120 | 120 |
| C-2 | 20 | 20 |
| D-1 | 98 | 98 |
| D-2 | 18 | 18 |
| AB1 | 98 | — |
| AB2 | 20 | — |
| AE1 | 120 | — |
| AE2 | 10 | — |

EXAMPLE 9

A nearly saturated aqueous solution of chromium fluoride and a nearly saturated aqueous solution of manganese fluoride were prepared by adding commercially available chromium fluoride ($CrF_3 \cdot 3H_2O$) and manganese fluoride ($MnF_2$) powders respectively in excess amounts to purified water and stirring the solutions for one hour. Soda lime glass pieces measuring equally 50 mm in length and width and 1 mm in thickness were thoroughly cleaned and dried, to be used as sample substrates.

Treating liquids, X and Y, were obtained by adding 5 cc and 40 cc respectively of an aqueous solution containing 0.5 mol of boric acid per liter to 100-ml aliquots of the nearly saturated aqueous solution of chromium fluoride ($CrF_3 \cdot 3H_2O$) and the nearly saturated aqueous solution of manganese fluoride ($MnF_2$). On a water bath kept at 35° C., 200-ml beakers containing the treating liquids X and Y were heated. In the treating liquids, the aforementioned sample substrates were immersed one each and kept standing for about 16 hours. Then, the sample substrates were removed from the beakers, cleaned, and dried. The films formed in the sample substrates, by a test with a contact needle type film thickness tester, were found to have thicknesses, 5 nm (the film formed of the treating liquid X) 10 nm (the film formed of the treating liquid Y). By the ESCA (X-ray photoelectron spectrography) analysis, the films were found to be formed of a substance consisting substantially of Cr and O (the film of the treating liquid X) and a substance consisting substantially of Mn and O (the film of the treating liquid Y) respectively.

EXAMPLE 10

Soda lime glass pieces measuring equally 50 mm in length and width and about 1 mm in thickness were thoroughly cleaned and dried, to be used as sample substrates.

Then solutions A (Fe), B (Ni), and E (Zn) were obtained by respectively dissolving $FeF_3 \cdot 3H_2O$, $NiF \cdot n-H_2O$, and $ZnF_2 \cdot 4H_2O$ substantially to saturation at room temperature in distilled water.

Thereafter, two mixed solutions were prepared each by mixing 50 ml of the solution A (Fe) with 50 ml of the solution B (Ni). Treating liquids, AB1 and AB2, were prepared by adding 10 ml and 20 ml respectively of an aqueous solution containing 0.5 mol of $H_3BO_3$ per liter to the two mixed solutions.

Treating liquids, AE1 and AE2, were obtained by preparing two mixed solutions each by mixing 50 ml of the solution A (Fe). with 50 ml of the solution E (Zn) and adding 10 ml and 20 ml respectively of an aqueous solution containing 0.5 mol of $H_3BO_3$ per liter to the two mixed solutions.

On a water bath kept at 35° C., 200-ml beakers severally containing the treating liquids were set to heat their contents. The aforementioned sample substrates were immersed two each in the treating liquids and left standing for 16 hours. After the standing, the sample substrates were removed from the beakers, cleaned, and then dried.

The films formed consequently on the sample substrates were tested for thickness with a contact needle type film thickness tester. The results were as shown in Table 4. By the ESCA (X-ray photoelectron spectrography) analysis, the films on the sample substrates were found to be formed of a substance consisting substantially of Fe, Ni, and O in the case of the films of the treating liquid AB1 and a substance consisting substantially of Fe, Zn, and O in the case of the films of the treating liquid AE1.

Figure 2:
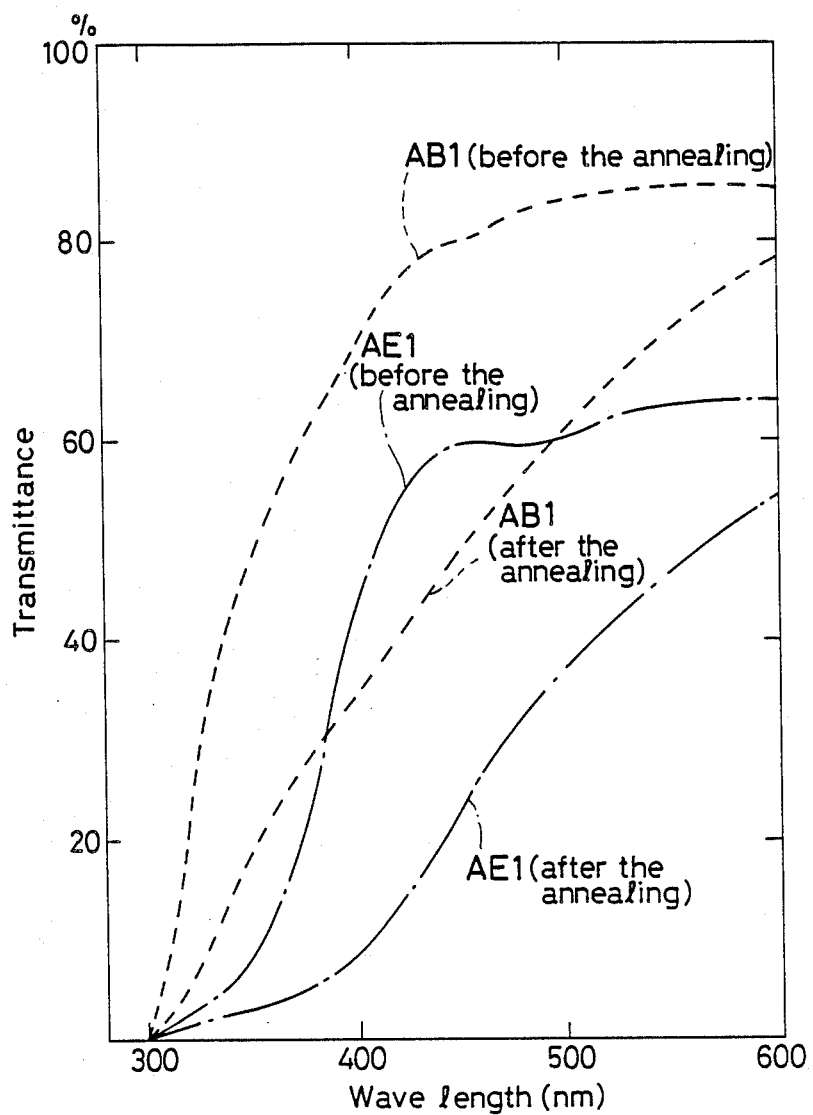
FIG. 2 is a diagram showing absorption spectra of oxide films produced in Example 11.

The glass samples on which films were formed in the treating liquids AB1 and AE1 were annealed one each at 450° C. for one hour. With a spectrophotometer, absorption spectra were obtained of the glass samples having the films of the treating liquids AB1 and AE1 formed thereon, each before and after the annealing. The results were as shown in FIG. 2. It is clearly noted from FIG. 2 that the optical characteristics of the films were altered by the aforementioned annealing treatment.

EXAMPLE 11

Figure 3:
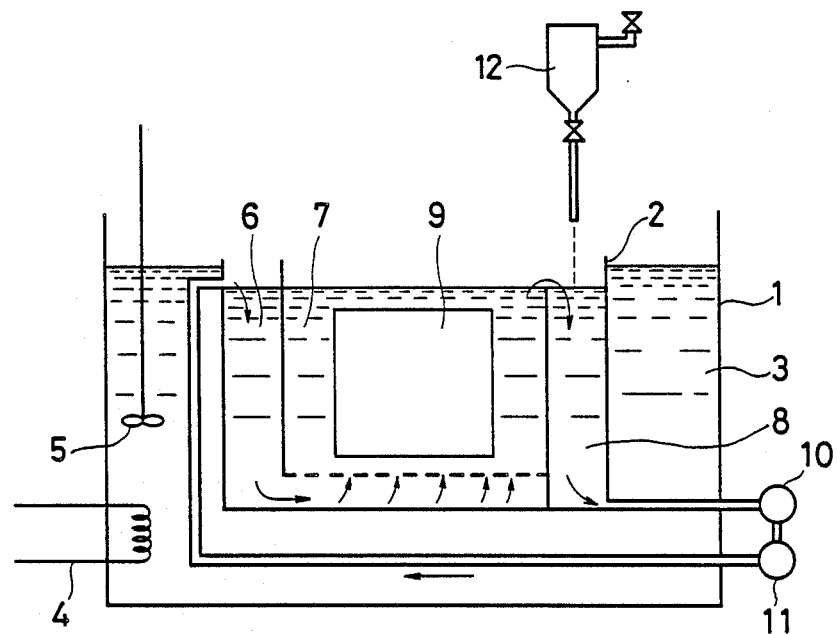
FIG. 3 is a systematic explanatory diagram illustrating a precipitated coat producing device used in Example 12 of the present invention.

By the use of a precipitated film producing device constructed as illustrated in FIG. 3, oxide iron films were produced on the polypropylene substrates by the following procedure.

In an immersing device constructed as shown in FIG. 3, about 3 liters of the aforementioned treating liquid was placed. As shown in FIG. 3, the immersing device comprised an outer tank (1) and an inner tank (2) and the space intervening between the inner tank and the outer tank was filled with water (3). This water was heated to 35° C. with a heater (4) and was kept stirred by a stirrer (5) to uniformize temperature distribution therein. The inner tank consisted of a front part (6), a middle part (7), and a rear part (8), which were filled with the aforementioned treating liquid.

Sample substrates were obtained by thoroughly cleaning and drying commercially available p.p. (polypropylene) pieces measuring equally 100 mm in length and width and about 1 mm in thickness. A solution to be supersaturated with iron oxide was obtained by dissolving $FeF_3 \cdot 3H_2O$ to saturation in distilled water at room temperature and filtering the resultant aqueous solution.

A circulation pump (10) was set operating to scoop up a fixed volume of the treating liquid from the rear part (8) of the inner tank, filter it through a filter (11), and return the filtrate to the front part of the inner tank (6) to establish a circulation of the treating liquid. Then, an aqueous solution (12) containing 0.5 mol of boric acid per liter was continuously added dropwise at a rate of 0.3 ml/min. to the rear part (8) of the inner tank and held standing for ten hours.

The absolute ratio of removal of the filter (11) was fixed at 1.5 $\mu$m and the amount of the treating liquid for circulation at 150 ml/min. (the proportion of the amount of circulation was about 8%/min because the total volume of the treating liquid was 3 linters).

Thereafter, the forementioned substrates (9) were immersed vertically in the central part (7) of the inner tank and held still in the immersed state for twelve hours. Then the samples were removed and new samples were immersed instead. This cycle of work was repeated two times at intervals of twelve hours.

The films of iron oxide obtained by the treatment described above were dried and then tested for thickness with a contact needle type film thickness tester. Consequently, they were found invariably to have a thickness of about 120 nm, indicating that the precipitation rate of about 10 nm/hr was maintained for 24 hours.

What is claimed is:

1. A method for the production of an oxide film on a surface of a substrate, comprising:
   preparing a treating liquid containing fluorine and at least one metal member selected from the group consisting of Sn, Zr, Zn, In, V, Cr, Mn, Fe, Co, Ni and Cu, said treating liquid containing the oxide of said selected metal dissolved therein to supersaturation, and
   contacting the substrate with the treating liquid to form an oxide film on the surface of the substrate.

2. The method according to claim 1, wherein a tin oxide film is formed on the surface of said substrate by establishing contact between said substrate and a treating liquid containing tin and fluorine and having tin oxide dissolved therein to supersaturation.

3. The method according to claim 2, wherein said treating liquid is a solution obtained by adding at least one additive selected from the group consisting of metal oxides, metal hydroxides, and metal chlorides to an aqueous solution of tin and fluorine.

4. The method according to claim 3, wherein said aqueous solution of tin and fluorine is an aqueous solution obtained by dissolving stannous oxide to saturation in an aqueous hydrofluoric acid solution.

5. The method according to claim 3, wherein said additive is at least one member selected from the group consisting of $ZnO$, $ZrO_2$, $H_3BO_3$, $Al(OH)_3$, $Zn(OH)_2$, $AlCl_3$, $CaCl_2$, $FeCl_2$, $FeCl_3$, $ZnCl_2$, $ZrCl_4$, $SnCl_4$, and $SnCl_2$.

6. The method according to claim 3, wherein the amount of said additive in said treating liquid is in the range of 0.5 to 5 mols per mol of fluorine contained in said treating liquid.

7. The method according to claim 1, wherein zirconium oxide is deposited on the surface of a substrate by establishing contact between said substrate and a treating liquid containing zirconium and fluorine and having zirconium oxide dissolved therein to supersaturation.

8. The method according to claim 7, wherein said treating liquid is a solution having zirconium oxide dissolved to supersaturation in zirconium hydrofluoric acid.

9. The method according to claim 7, wherein said treating liquid is a solution obtained by adding at least one member selected from the group consisting of metals, metal chlorides, metal hydroxides, and boric acid to a solution having zirconium oxide dissolved to saturation in zirconium hydrofluoric acid thereby allowing zirconium oxide contained to supersaturation therein.

10. The method according to claim 8, wherein the concentration of zirconium hydrofluoric acid in said treating liquid is in the range of 0.1 to 2 mols per liter.

11. The method according to claim 9, wherein said additive is at least one member selected from the group consisting of Al, Fe, $AlCl_3$, $Al(OH)_3$, $FeCl_2$, $FeCl_3$, $H_3BO_3$ and $B_2O_3$.

12. The method according to claim 9, wherein the amount of said additive in said treating liquid is in the range of 2 to 10 mols per mol of zirconium hydrofluoric acid present in said treating liquid.

13. The method according to claim 1, wherein zinc oxide is deposited on the surface of a substrate by establishing contact between said substrate and a treating liquid containing zinc and fluorine and having zinc oxide dissolved to supersaturation therein.

14. The method according to claim 13, wherein the concentration of zinc in said treating liquid is not less than 0.0001 mol per liter.

15. The method according to claim 13, wherein said treating liquid is a solution obtained by adding at least one additive selected from the group consisting of metals, metal chlorides, metal hydroxides, and boric acid to a solution containing zinc and fluorine thereby having zinc oxide dissolved to supersaturation therein.

16. The method according to claim 15, wherein said additive is at least one member selected from the group consisting of Al, Fe, $AlCl_3$, $FeCl_2$, $FeCl_3$, $Al(OH)_3$, $CaCl_2$, $ZrCl_4$, $H_3BO_3$, and $B_2O_3$.

17. The method according to claim 15, wherein the amount of said additive in said treating liquid is in the range of 0.1 to 50 mols per mol of zinc present in said treating liquid.

18. The method according to claim 1, wherein indium oxide is deposited on the surface of a substrate by establishing contact between said substrate and a treating liquid containing indium and fluorine and thereby having indium oxide dissolved to supersaturation therein.

19. The method according to claim 18, wherein said treating liquid is a solution obtained by adding at least one additive selected from the group consisting of metals, metal chlorides, metal hydroxides, and boric acid to an aqueous solution of indium and fluorine.

20. The method according to claim 19, wherein said additive is at least one member selected from the group consisting of Al, Fe, $AlCl_3$, $FeCl_2$, $FeCl_3$, $Al(OH)_3$, $CaCl_2$, $ZrCl_4$, $H_3BO_3$, and $B_2O_3$.

21. The method according to claim 19, wherein the concentration of indium in said treating liquid is not less than 0.0001 mol per liter.

22. The method according to claim 19, wherein the amount of said additive in said treating liquid is in the range of 1 to 50 mols per mol of indium present in said treating liquid.

23. The method according to claim 1, wherein a film of the oxide of a metal selected from the group consisting of V, Cr, Mn, Fe, Co, Ni, and Cu is deposited on the surface of a substrate by establishing contact between said substrate and a treating liquid containing fluorine and said selected metal thereby having the oxide of said metal dissolved to supersaturation therein.

24. The method according to claim 23, wherein said treating liquid is a solution obtained by adding at least one additive selected from the group consisting of metals, metal chlorides, . metal hydroxides, and boric acid to an aqueous solution of said metal and fluorine.

25. The method according to claim 24, wherein said additive is at least one member selected from the group consisting of Al, Fe, $AlCl_3$, $FeCl_2$, $FeCl_3$, $Al(OH)_3$, $CaCl_2$, $ZrCl_4$, $H_3BO_3$, and $B_2O_3$.

26. The method according to claim 24, wherein the concentration of said metal in said treating liquid is not less than 0.0001 mol per liter.

27. The method according to claim 24, wherein the amount of said additive in said treating liquid is in the range of 0.1 to 100 mols per mol of said metal present in said treating liquid.

28. The method according to claim 1, wherein the temperature of said treating liquid is not higher than 60° C.

29. The method according to claim 1, wherein the pH value of said treating liquid is not more than 2.

30. The method according to claim 1, wherein said film of metal oxide deposited on the surface of said substrate is further subjected to a heat treatment.

* * * * *